(12) United States Patent
Harris

(10) Patent No.: US 8,582,675 B1
(45) Date of Patent: Nov. 12, 2013

(54) PRE-CHANNELIZED SPECTRUM ANALYZER

(76) Inventor: Fredric J. Harris, Spring Valley, CA (US)

(*) Notice: Subject to any disclaimer, the term of this patent is extended or adjusted under 35 U.S.C. 154(b) by 245 days.

(21) Appl. No.: 13/151,270

(22) Filed: Jun. 1, 2011

Related U.S. Application Data (60) Provisional application No. 61/350,131, filed on Jun. 1, 2010.

(51) Int. Cl.
*H04K 1/10* (2006.01)

(52) U.S. Cl.
USPC .............. 375/260; 375/316; 702/76; 702/77; 702/75; 702/66; 324/76.19; 324/76.12; 324/76.21; 324/76.22; 324/76.29; 324/76.31

(58) Field of Classification Search
USPC .................. 375/260, 316; 702/76, 77, 75, 66; 324/76.19, 76.12, 76.21, 76.22, 76.29, 324/76.31
See application file for complete search history.

(56) References Cited

U.S. PATENT DOCUMENTS

| | | | | |
|---|---|---|---|---|
| 5,168,214 | A * | 12/1992 | Engeler et al. | 324/76.33 |
| 6,782,057 | B2 * | 8/2004 | Greer et al. | 375/268 |
| 7,027,942 | B1 * | 4/2006 | Woodard et al. | 702/76 |
| 7,675,985 | B1 * | 3/2010 | Watson | 375/260 |
| 2006/0195279 | A1 * | 8/2006 | Feldhaus et al. | 702/75 |

OTHER PUBLICATIONS

A coupled multichannel filter bank and sniffer spectrum analyzer by Fred Harris, Robert McGwier, and Benjamin Egg, dated 2010.*
An efficient constant-Q spectrum analyzer architecture using polyphase filter bank by Elettra Venosa, Xiaofei Chen, and Fred Harris, dated 2010.*
A versatile multichannel filter bank with multiple channel bandwidth by Fred Harris, Robert McGwier, and Benjamin Egg, dated 2010.*
Fredric J. Harris, "Multirate Signal Processing for Communication Systems," Jun. 2005, pp. 1-478; Prentice Hall PTR, Upper Saddle River, New Jersey 07458.

* cited by examiner

*Primary Examiner* — Siu Lee
(74) *Attorney, Agent, or Firm* — Law Office of Glenn R. Smith; Glenn R. Smith; Lisa L. Smith (57) ABSTRACT

A pre-channelized spectrum analyzer utilizes a channelizer as a preprocessor for parallel-configured low-resolution spectrum analyzers so as to perform as a high resolution spectrum analyzer. The pre-channelized spectrum analyzer has a polyphase filter that channelizes a signal input and an IFFT that generates filter bank outputs derived from the channelized signal. Spectrum analyzers are in communications with the filter bank outputs so as to generate a spectral decomposition of a subset of those outputs. The spectrum analyzers each perform a window and an FFT function on a corresponding one of the filter bank subset.

12 Claims, 6 Drawing Sheets

PRE-CHANNELIZED SPECTRUM ANALYZER

PRIORITY CLAIM TO RELATED PROVISIONAL APPLICATIONS

The present application claims priority benefit under 35 U.S.C. §119(e) to U.S. Provisional Patent Application Ser. No. 61/350,131 filed Jun. 1, 2010, titled Coupled Spectrum Analyzer and Channelizer; the above-cited provisional patent application is hereby incorporated by reference herein.

BACKGROUND OF THE INVENTION

Figure 1:
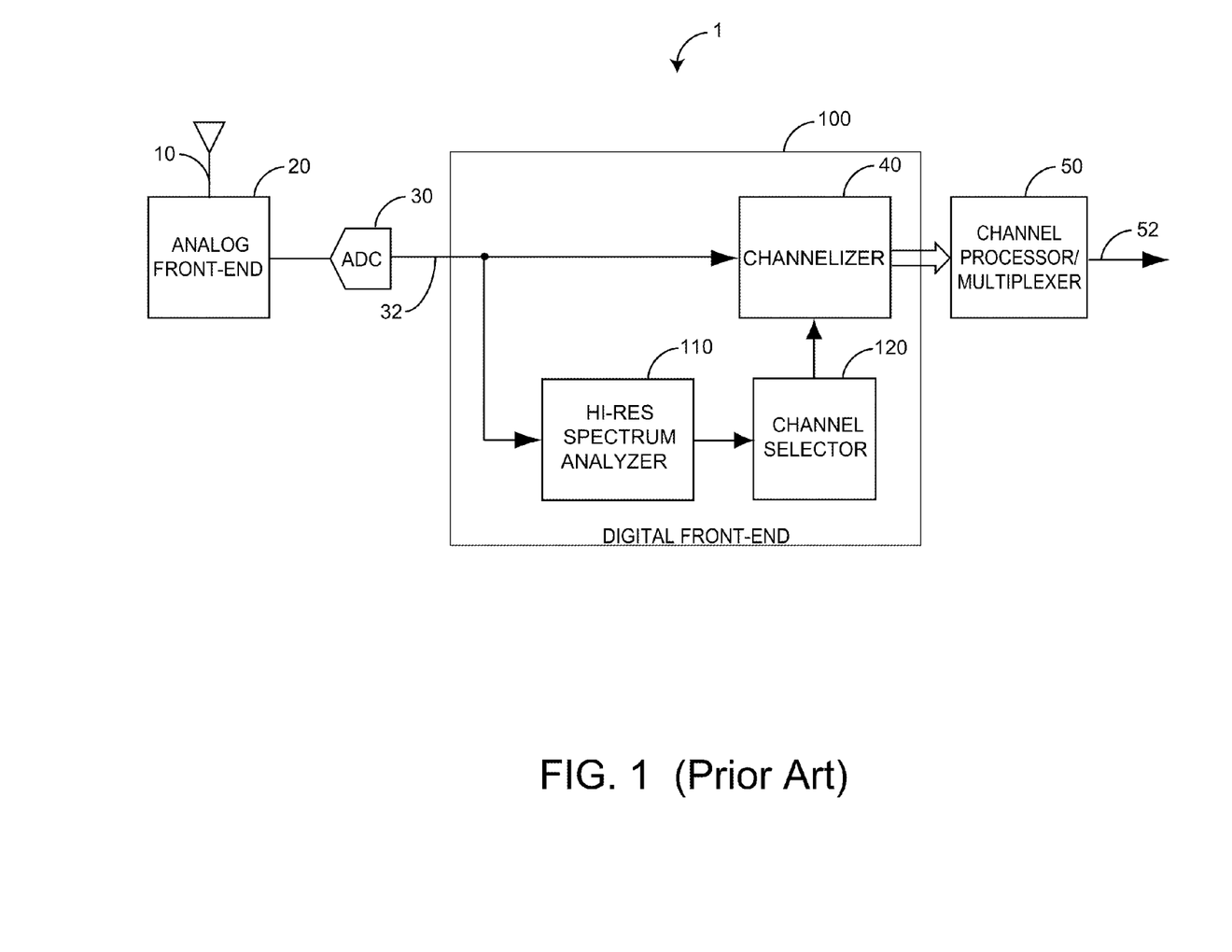
FIG. 1 is a general block diagram of a high resolution spectrum analyzer coupled with a digital up-converter or down-converter channelizer used for various radio scanner and cognitive radio applications.

FIG. 1 generally illustrates a digital receiver system 1 for, as examples, radio scanner and cognitive radio applications. The digital receiver system 1 has an RF source 10, an analog front end 20, an analog-to digital converter (ADC) 30 that provides a digital input 32 to a digital front-end 100 and a channel processor/multiplexer 50 that provides an application specific output 52. The digital front-end 100 has a high resolution spectrum analyzer 110, a channel selector 120, and a channelizer 130. In radio scanner applications, the high resolution spectrum analyzer 110 provides multiple spectral bands to the channel selector 120, which identifies channels of interest for down conversion by the channel processor 50. In cognitive radio system applications, the high resolution spectrum analyzer 110 provides multiple spectral bands to the channel selector 120, which identifies channels for up conversion by the channel processor 50 for insertion into empty spectral spans.

SUMMARY OF THE INVENTION

Figure 2:
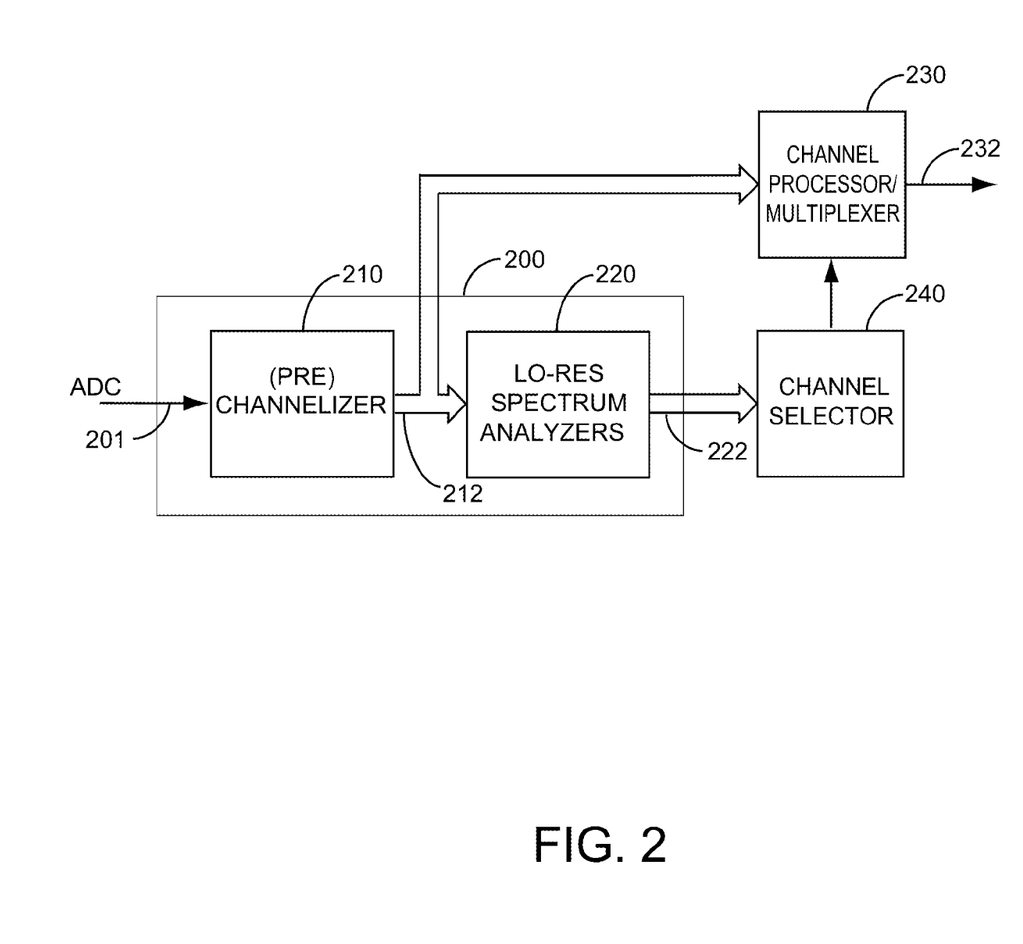
FIG. 2 is a general block diagram of a pre-channelized spectrum analyzer configured as a computationally efficient radio scanner or cognitive radio.

FIG. 2 generally illustrates a pre-channelized spectrum analyzer 200 which advantageously utilizes a (pre) channelizer 210 as a time series preprocessor for parallel-configured low-resolution spectrum analyzers 220. This configuration performs the same tasks as larger, more costly and/or more computationally burdened high resolution spectrum analyzers 110 (FIG. 1). In particular, spectrum analyzers utilize an FFT (Fast Fourier Transform) supported by a set of weights, the window, applied to data multiplicatively. Channelizers utilize an FFT supported by a set of weights, the filter, applied to data convolutionally. Both operations, however, accomplish the same task, which is spectral decomposition with controlled spectral response. In reality, the two operations are identically the same because a sliding windowed FFT (spectrum analysis) is in fact a particular implementation of a resampling filter bank (channelization). Because the two processes of spectrum analysis and channelization are the same mathematically, when a system includes both a channelizer and a spectrum analyzer that steers the channelizer to spectral areas of interest, the channelizer can advantageously share the spectrum analyzer's computational burden.

As shown in FIG. 2, the (pre) channelizer 210 provides a filter bank output 212 to the low resolution spectrum analyzers 220. The filter bank output 212 is also a channel processor 230 input 212. The spectrum analyzers 220 output 222 is input to a channel selector 240, which indicates the filter bank outputs 212 of interest. The channel selector 240, channel processor 230 and channel processor output 232 are application specific. In an embodiment, the pre-channelized spectrum analyzer 200 functions in conjunction with the channel selector 240 and channel processor 230 for radio scanner and cognitive radio applications.

One aspect of a pre-channelized spectrum analyzer utilizes a channelizer as a preprocessor for parallel-configured low-resolution spectrum analyzers so as to perform as a high resolution spectrum analyzer. The pre-channelized spectrum analyzer comprises a polyphase filter that channelizes a signal input and an IFFT that generates filter bank outputs from the channelized signal. Spectrum analyzers are in communications with a subset of the filter bank outputs so as to generate a spectral decomposition of the subset. The spectrum analyzers each having a window and an FFT. In various embodiment, the polyphase filter comprises a series of N-point samples of the signal input, a plurality of 4N-point windows of the N-point samples, where each window overlaps 75%; and a 4-path polyphase partition of the 4N-point windows. The IFFT is a 4N point transform of the polyphase filter outputs. The polyphase filter has 720 paths and the IFFT is a corresponding 720 point inverse transform. The IFFT maps into an uncoupled 3-dimensional IFFT having 5-points, 9-points and 16 points. The spectrum analyzers select 180 of the 720 filter banks and uses a 45-point transform so as to match a 45 point transform embedded in the 720 point IFFT. The polyphase filter is folded into the IFFT.

Another aspect of a pre-channelized spectrum analyzer method comprises inputting a broadband digitized signal derived from an RF source, polyphase filtering the digitized signal into a channelized time domain series, transforming the channelized time domain series into a filter bank, windowing a subset of the filter bank and frequency transforming the windowed subset into a spectrum analyzer output. Ensemble averaging comprises an absolute value of the spectrum analyzer output, limiting the dynamic range of the ensemble average and utilizing the dynamic range limited ensemble average to select one channel of the channelized time domain series. Transforming comprises defining a 720 point IFFT of the channelized time domain series and partitioning the IFFT into 5-point, 9-point and 16 point IFFTs. Windowing comprises selecting 180 of the 720 filter banks. Frequency transforming comprises performing a 45-point transform.

DETAILED DESCRIPTION OF THE PREFERRED EMBODIMENTS

Figure 3:
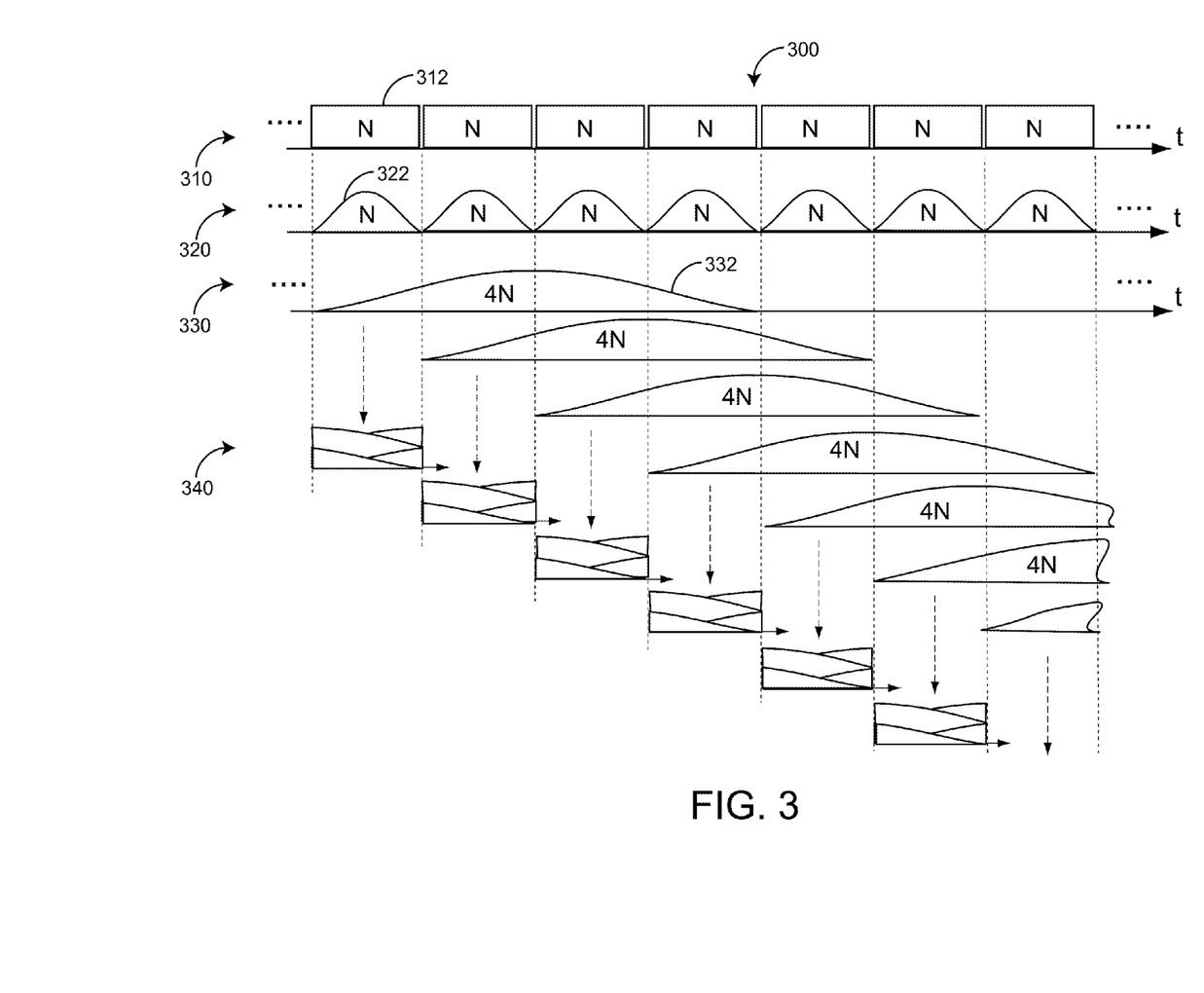
FIG. 3 is a graph of successive windowed intervals of length N and 4N.

FIG. 3 illustrates successive windowed intervals 300 of length N and 4N. Spectrum analysis gathers successive overlapped N point sequences 310 of a time series, where each sequence is processed by an N-point DFT (Discrete Fourier Transform). The raw power spectral estimates from each DFT are ensemble averaged to reduce the variance of the estimates. The signal samples in each interval are turned-on at the start of the data collection interval and are turned-off at the end of the data collection interval. This operation is often called a gating process or default window that uses a rectangle weighting series 312 to select the segment of the input time series to be processed by the DFT. The multiplicative window modifies the observed spectrum by inducing boundaries on the signal not related to the signal itself but rather to the observation process. The spectral side-lobes of the window's Fourier transform permit signal energy at one frequency to influence and bias the observed energy at another. This effect, known as spectral leakage, is related to the discontinuity caused by the gating process. The DFT describes the input sequence as a weighted sum of N sinusoids harmonically related to the signal collection interval of length N. The IDFT (Inverse Discrete Fourier Transform) describes the periodic extension of the input sequence. If the sequence is not periodic, the periodic extension exhibits discontinuities in many order derivatives at the wrap-around boundary. To minimize spectral artifacts, these discontinuities must be suppressed.

As shown in FIG. 3, discontinuities are suppressed at the boundary by applying a multiplicative weighting function 322 called a window, which gently and smoothly brings the weighted sample values and all order derivatives at the boundary to near zero values. As shown in the first line 310, the N-point boundaries of the input time interval are defined by the default rectangle window. As shown in the second line 320, the smooth weighting or window functions 322 span the same intervals as the initial rectangle window 312. Use of the window widens the main-lobe width of the window's Fourier transform, typically by (but limited to) a factor of 4, which reduces the ability of the spectrum analyzer to resolve or separate closely spaced spectral components. This reduction in spectral resolution is compensated by lengthening the window time duration from N to 4N. Each lengthened window 332 has the same starting point on the time line as did the original N-point window. Note the windows are now overlapped and the sequence of operations is known as a sliding windowed spectrum analyzer. The lengthened window has a main-lobe spectral width that again matches the width of the rectangle spectral main lobe. The lengthened window would normally require the use of a longer length 4N point DFT. The longer length 4N point DFT would offer 4-times as many spectral samples or DFT bins as the original length N point DFT but would require more than a 4-to-1 increase in computation to compute the longer transform. Additional work load and an increase in the number of spectral bins are avoided by down-sampling the 4N point DFT and only computing every 4-th frequency point. The down-sampling operation has two effects. The first is that the window experiences a 4-to-1 time domain alias and the second is that the 4N point DFT kernel when down sampled 4-to-1 becomes the kernel of the N-point DFT. This folds the windowed data 340 in the time domain and performs the same N-point DFT on the length 4-N windowed and time folded time series. The effect of the window is seen in the main lobe and the side-lobe of the window's Fourier transform, as described with respect to FIGS. 4A-C, below.

Figure 4A:
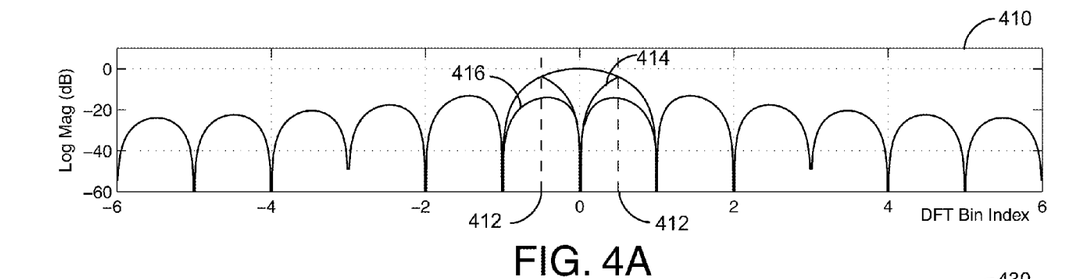
FIGS. 4A-C are spectra of N-point rectangle; N-point 4-term Blackman-Harris; and 4N-point Blackman-Harris windows, respectively, showing spectral folding of the main lobe down-sampled to N-to-1, N/4-to-1 and N-to-1 accordingly.

FIG. 4A shows the spectra 410 of an N-point rectangle window 312 (FIG. 3) with equally spaced zero crossings that alias to DC when down sampled N-to-1 in a non-overlapped sequence of windowed DFTs. Shown are the fold points 412 and the aliased main lobe 414 and side lobe 416.

Figure 4B:
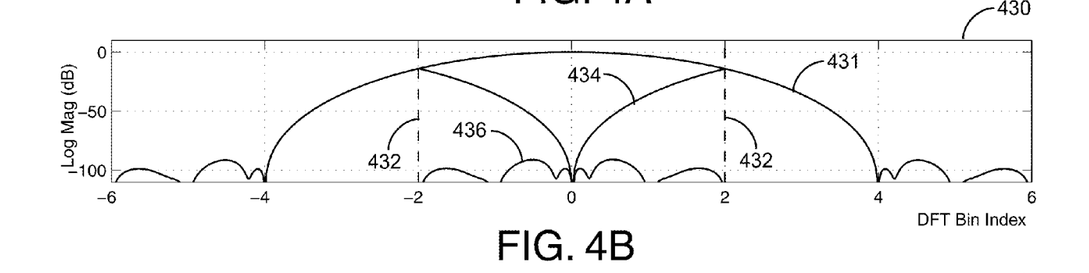

FIG. 4B shows the spectra 430 of an N-point window 322 (FIG. 3) applied to each interval to reduce spectral side lobe levels to near −50, −70, or −90 dB. The main lobe 431 width is increased by a factor of 2, 3, or 4 respectively. To satisfy the Nyquist criteria, the 4-times wider main lobe width requires sampling the output of the transform 4-times as often, hence a 4-to-1 overlap of the successive window intervals. In order to obtain the side lobe suppression of the good window without increasing the main lobe width, the window length can be increased from N to 4N 332 (FIG. 3) while still maintaining the same 4-to-1 overlap of the intervals required by the Nyquist criterion. The 4N point windowed sequence could be offered to a 4N point DFT, but that would increase the number of output frequency bins as well as the processing workload. Effectively, the 4N points are presented to the 4N point DFT and then every 4-th spectral output is taken, which would match the spectral sample spacing of the N-point DFT. The 4-to-1 down-sampling of the DFT spectra causes 4-fold aliasing of its windowed time series. The 4-fold aliasing is a polyphase partition of the window sequence 340 (FIG. 3). This polyphase interpretation of the time domain aliasing is shown in EQ. 1. Here the inner summation is the polyphase partition of the window.

$$H_{4N}(k) = \sum_{n=0}^{4N-1} d(n)w_{4N}(n)e^{-j\frac{2\pi}{4N}nk} \quad \text{(EQ. 1)}$$

$$H_{4N}(4k) = \sum_{n=0}^{4N-1} d(n)w_{4N}(n)e^{-j\frac{2\pi}{4N}n4k}$$

$$= \sum_{n=0}^{4N-1} d(n)w_{4N}(n)e^{-j\frac{2\pi}{N}nk}$$

$$= \sum_{n=0}^{N-1} \left[\sum_{s=0}^{3} d(n+4s)w_{4N}(n+4s)\right] e^{-j\frac{2\pi}{N}nk}$$

In an embodiment based on the above, the windowing procedure for an N-point DFT uses a window of at least length 4N which is folded or partitioned into a 4-path polyphase filter.

Figure 4C:
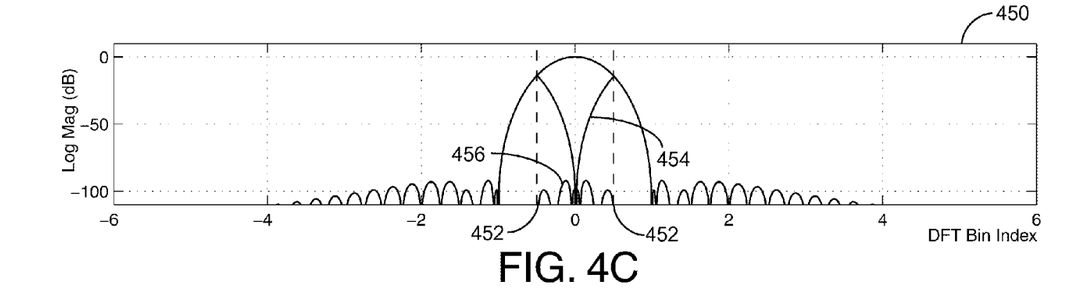

FIG. 4C shows the folding of the spectral main lobe 454 when the DFT is down-sampled N-to-1, i.e. 1-output sample for every N-input samples. This folding corrupts the spectral content of the pass band frequency span. This corruption is avoided by increasing the sample rate from N-to-1 to N/2-to-1. This means that the N-point polyphase window and DFT should operate in the same manner as a polyphase channelizer.

Figure 5A:
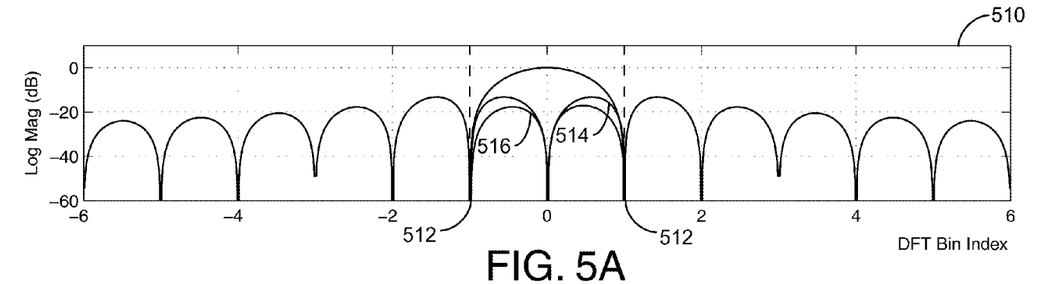
FIGS. 5A-C are spectra of N-point rectangle; N-point 4-term Blackman-Harris; and 4N-point Blackman-Harris windows, respectively, showing spectral folding of the main lobe down-sampled to N/2-to-1, N/8-to-1 and N/2-to-1 accordingly.
Figure 5B:
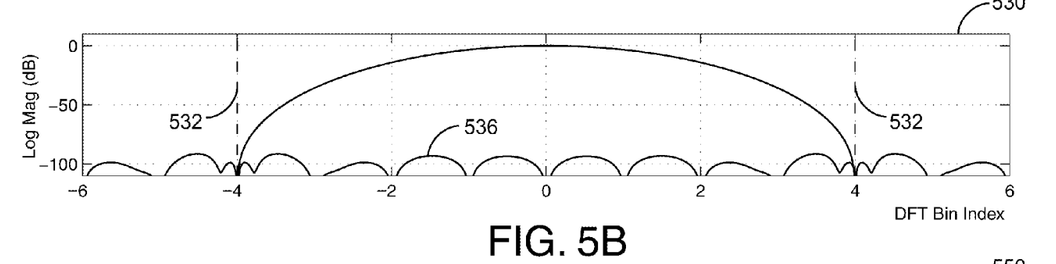
Figure 5C:
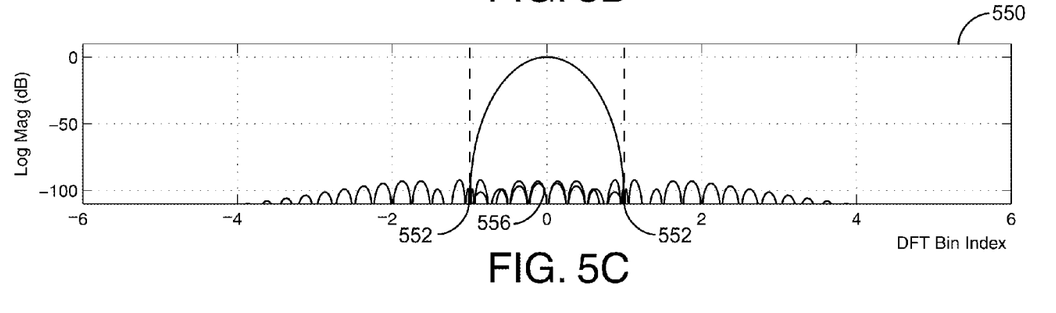

FIGS. 5A-C illustrate the change in spectral folding due to the increased sample rate from N-to-1 to N/2-to-1 (compared with FIGS. 4A-C). The alias free spectra (FIG. 5C) available from the N/2-to-1 down-sampled output of a channelizer and of a folded sliding windowed spectrum analyzer DFT allows a cascade of the channelizer and spectrum analyzer functions to obtain successively narrower channel bandwidths and higher resolution spectral analysis, as described below.

In order to provide a comparative example with FIG. 6, below, the following analysis assumes the configuration of FIG. 1, above, and the following described parameters. The input sample rate to the system is 90 MHz. The channelizer is a 720 path polyphase filter followed by 16 sets of channel phase rotator vectors. The phase rotators offer spectral center spacing of 125 kHz. The prototype filter in the polyphase partition has a bandwidth of 250 kHz and the output sample rate of the channelizer is 500 KHz. The available adjacent channels overlap by 50%. This overlap assures that signal spectra of interest, with bandwidths less than 125 kHz and with arbitrary center frequency, will be contained in at least one channel. The channelizer does 180-to-1 down sampling to obtain the 500 kHz output rate. All 720 center frequencies are aliased to DC in the polyphase partition. A channel selector can direct the channelizer to un-alias up to 16 channels by appropriate phase aligned summations that match the unique phase profiles of the selected aliased signal set. The channel selector monitors the smoothed spectral estimates obtained from a 8192 point spectrum analyzer running in parallel with the channelizer. The spectrum analyzer has a polyphase partitioned set of 32,768 weights that define its spectral characteristics. The equivalent channel filters of the spectrum analyzer are very nearly the spectrum shown in FIG. 5C. The resolution bandwidth of the spectrum analyzer is 90 MHz/8192 which equals 10.986 kHz, a width of approximately 11 kHz.

Figure 6:
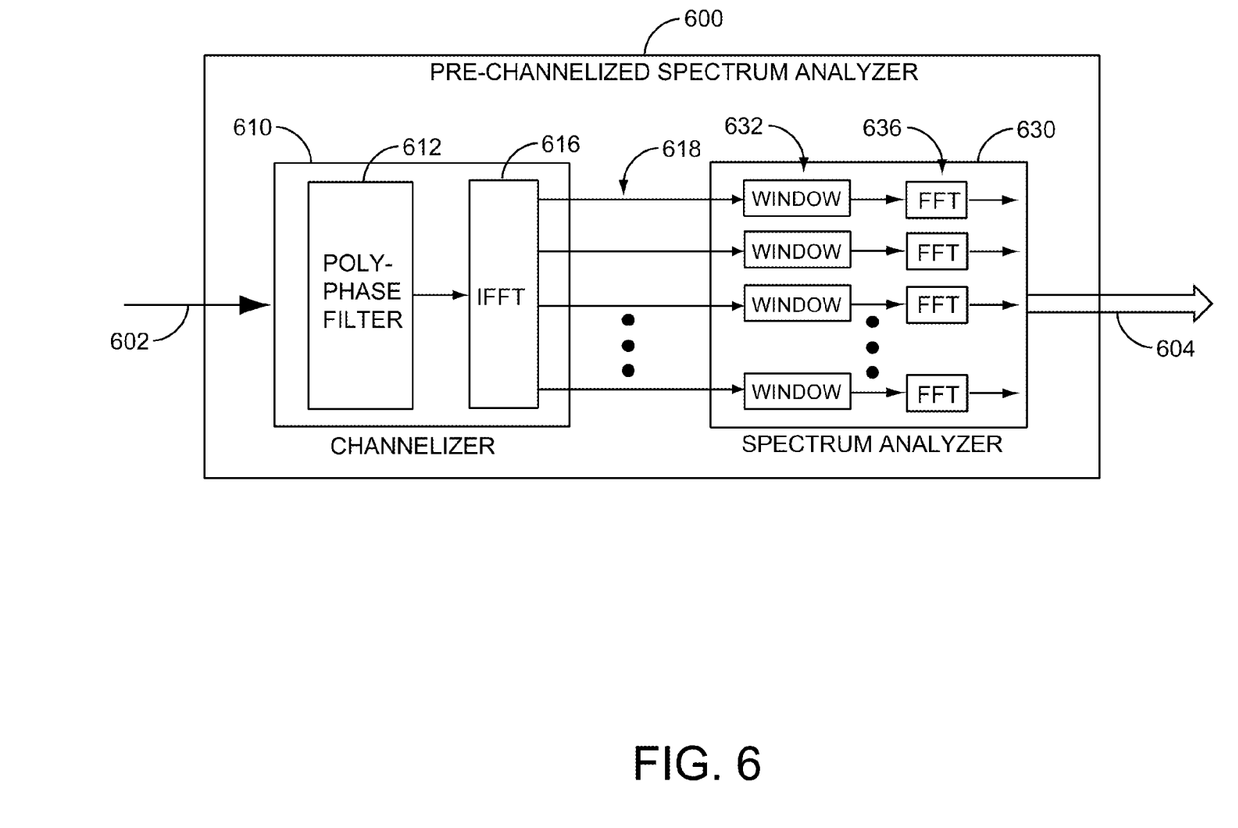
FIG. 6 is a detailed block diagram of a pre-channelized spectrum analyzer.

FIG. 6 illustrates a pre-channelized spectrum analyzer 600 embodiment. A first approach is to replace the complex inner products that perform phase coherent sums for each of the 16 selected channels (described immediately above with respect to FIG. 1) with an efficient 720 point IFFT 616. In general, the FFT becomes more efficient than the set of inner products when the number of inner products exceeds $\log_2(N)$. When N is 720, this cross over point occurs between 9 and 10 channels. Thus, an efficient 720 point FFT is advantageous. The number 720 is highly composite with factors 5, 9, and 16. These factors are primes or powers of primes which means they lend themselves well to the prime-factor or Good-Thomas partition of the DFT. The prime factor algorithm maps the one dimensional DFT to an uncoupled multi-dimension, in this case a 3-dimension DFT. The uncoupling means there are no twiddle factors or phase spinners to be applied to the intermediate arrays between directions or corner turns. All that is needed to implement the 720 point IFFT is a set of efficient 5-point, 9-point, and 16 point IFFTs. The most efficient version of these is the Winograd Fourier transform algorithm. The polyphase filter 612, when folded into the 720 point Winograd DFT, obtains all 720 output channels for less than 11% of the computational cost of the 16 channels obtained by the channel selection formed by 720-point inner products (FIG. 1).

With access to the output of the full filter bank 618, a set of short transforms can be applied to each filter bank time series to obtain the high resolution spectral decomposition. The decomposition of every filter output is not needed. The channel filters are designed with a 50% overlapped. Accordingly, alternate channels of the channelizer 610 can likely obtain the spectral record. In addition, there is probably only interest in less than half of the 90 MHz bandwidth. Thus, rather than process the time series from each of the 720 channels, it is likely that 180 of them will yield valid spectral estimates.

The frequency resolution from the short channel based transforms is desirably comparable to that of the 8192 point transform of the high resolution spectrum analyzer 110 (FIG. 1). This resolution is about 11 kHz. The data rate out of each channel is 500 kHz. So to obtain the same 11 kHz resolution the transform length needs to be 500/11 or near length 45. A 45 point transform is embedded in the 720 point transform so this is an advantageous match. The 45 point Good-Thomas Winograd transform requires 190 real multiples to process complex input signals. If a 4-fold polyphase window is used to shape the frequency response of the 45-point transform, another 180 points of multiplication are available for both I and Q input samples for an additional 380 multiplies per transform cycle. Here again the shaping filter requires more work than does the transform and the total work per windowed 45-point transform is 570 multiplies per spectral estimation cycle. The workload for spectrum analysis of the selected 180 channels 604 is less than half the work load of the original 8192 point spectrum analyzer 110 (FIG. 1).

A pre-channelized spectrum analyzer has been disclosed in detail in connection with various embodiments. These embodiments are disclosed by way of examples only and are not to limit the scope of this disclosure. One of ordinary skill in art will appreciate many variations and modifications.

What is claimed is:

1. A pre-channelized spectrum analyzer utilizes a channelizer as a preprocessor for a plurality of parallel-configured low-resolution spectrum analyzers so as to perform as a high resolution spectrum analyzer, the pre-channelized spectrum analyzer comprising:
    a polyphase filter that channelizes a signal input;
    an IFFT that generates a plurality of filter bank outputs from the channelized signal;
    a plurality of spectrum analyzers in communications with a subset of the filter bank outputs so as to generate a spectral decomposition of the subset; and
    the spectrum analyzers each having a window and an FFT.

2. The pre-channelized spectrum analyzer according to claim 1 wherein the polyphase filter comprises:
    a series of N-point samples of the signal input;
    a plurality of 4N-point windows of the N-point samples, where each window overlaps 75%; and
    a 4-path polyphase partition of the 4N-point windows.

3. The pre-channelized spectrum analyzer according to claim 2 wherein the IFFT is a 4N point transform of the polyphase filter outputs.

4. The pre-channelized spectrum analyzer according to claim 3 wherein the polyphase filter has 720 paths and the IFFT is a corresponding 720 point inverse transform.

5. The pre-channelized spectrum analyzer according to claim 4 wherein the IFFT maps into an uncoupled 3-dimensional IFFT having 5-points, 9-points and 16 points.

6. The pre-channelized spectrum analyzer according to claim 5 wherein the spectrum analyzers select 180 of the 720 filter banks and uses a 45-point transform so as to match a 45 point transform embedded in the 720 point IFFT.

7. The pre-channelized spectrum analyzer according to claim 6 wherein the polyphase filter is folded into the IFFT.

8. A pre-channelized spectrum analyzer method comprising:
    inputting a broadband digitized signal derived from an RF source;
    polyphase filtering the digitized signal into a channelized time domain series;
    transforming the channelized time domain series into a filter bank;
    windowing a subset of the filter bank; and
    frequency transforming the windowed subset into a spectrum analyzer output.

9. The pre-channelized spectrum analyzer method according to claim 8 further comprising:
    ensemble averaging an absolute value of the spectrum analyzer output;
    limiting the dynamic range of the ensemble average; and
    utilizing the dynamic range limited ensemble average to select one channel of the channelized time domain series.

10. The pre-channelized spectrum analyzer method according to claim 9 wherein the transforming comprises:
    defining a 720 point IFFT of the channelized time domain series; and partitioning the IFFT into 5-point, 9-point and 16 point IFFTs.

11. The pre-channelized spectrum analyzer method according to claim 10 wherein the windowing comprises selecting 180 of the 720 filter banks.

12. The pre-channelized spectrum analyzer method according to claim 11 wherein the frequency transforming comprises performing a 45-point transform.

* * * * *